United States Patent
Smith

(10) Patent No.: US 8,185,928 B2
(45) Date of Patent: May 22, 2012

(54) SYSTEM AND METHOD FOR ADAPTIVE BACKOFF

(75) Inventor: Donald E. Smith, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 625 days.

(21) Appl. No.: 12/337,725

(22) Filed: Dec. 18, 2008

(65) Prior Publication Data

US 2010/0162318 A1    Jun. 24, 2010

(51) Int. Cl.
*H04N 7/173* (2006.01)
*H04L 12/413* (2006.01)
*G06F 11/00* (2006.01)

(52) U.S. Cl. ............. 725/116; 725/87; 725/90; 725/93; 370/448; 714/704; 714/1; 714/47.1

(58) Field of Classification Search .................. None
See application file for complete search history.

(56) References Cited

U.S. PATENT DOCUMENTS

| | | | | |
|---|---|---|---|---|
| 5,636,139 A | * | 6/1997 | McLaughlin et al. | 709/219 |
| 5,963,557 A | * | 10/1999 | Eng | 370/432 |
| 7,631,076 B2 | * | 12/2009 | Cannon et al. | 709/225 |
| 2005/0144044 A1 | * | 6/2005 | Godschall et al. | 705/3 |

* cited by examiner

*Primary Examiner* — Brian T Pendleton
*Assistant Examiner* — Jason Lin

(57) ABSTRACT

A system and method for providing adaptive backoff including one or more transmitters configured to transmit a first data request to a media module at a scheduled time, poll the media module to determine accessibility of the media module, and transmit a second data request to the media module at a rescheduled time determined by the one or more processors. The system and method may also include one or more processors configured to determine that the media module is inaccessible and set the rescheduled time for the media box to transmit a second data request to the media module when the media module is accessible, wherein the rescheduled time is based at least in part on optimizing system capacity of the media module. The system and method may also include one or more receivers configured to receive one or more responses to the polling indicating accessibility of the media module and receive data from the media module based on the second data request. The system and method may also include an output configured to output the data to one or more output devices.

20 Claims, 8 Drawing Sheets

SYSTEM AND METHOD FOR ADAPTIVE BACKOFF

BACKGROUND INFORMATION

Televisions are popular with consumers. Because of advances in recent technology, electronic on-screen program guides have enabled viewers to quickly find and watch desired programs without bulky paper-bound guides. These electronic program guides (EPGs) allow viewers to see what TV programs are playing, or scheduled, on all the channels available to the viewer. Each day, hundreds of thousands subscriber set top boxes may request new electronic program guides (EPGs) during early morning hours. In the event of system failure (e.g., server failure), subscriber set top boxes may not be able to communicate with the servers responsible for providing these new electronic program guides (EPGs). Set top boxes whose initial update requests have failed may continuously send update requests every few seconds. However, in the event of a long failure period, these clustered update requests may further overwhelm the system/servers, leading to new request failures and new reattempts.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Figure 1:
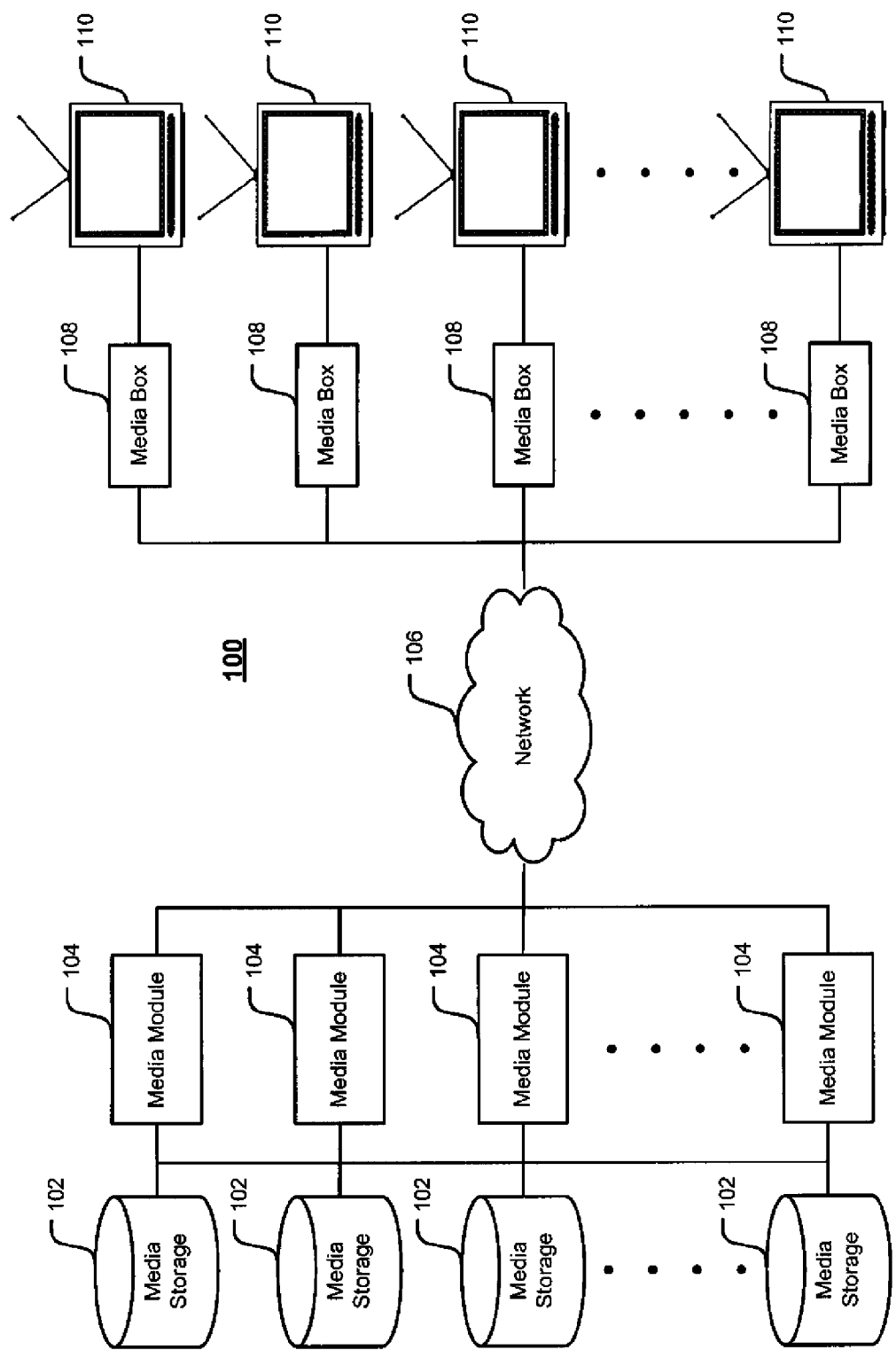
FIG. 1 depicts a block diagram of a system architecture for providing adaptive backoff, according to an exemplary embodiment.

Reference will now be made in detail to exemplary embodiments, examples of which are illustrated in the accompanying drawings. Wherever possible, the same reference numbers will be used throughout the drawings to refer to the same or like parts. It should be appreciated that the following detailed description are exemplary and explanatory only and are not restrictive.

The exemplary systems and methods are discussed in terms of providing adaptive "reattempt algorithm," "backoff," and/ or "backoff algorithm." It should be appreciated that as used herein, a "reattempt algorithm" may be method and/or protocol which is followed in the event of system failure. It should be appreciated that as used herein, "backoff" may refer to an amount of time for "backing off" before a reattempt. It should also be appreciated that "reattempt algorithm" and "backoff algorithm" may be used interchangeably herein.

Backoff or reattempt algorithms may be used in various types of shared access media. These may include Ethernet systems, wireless configurations, and/or other similar system/network configurations. When a high volume of subscribers/clients attempt to use/access the shared access media at the same time, the attempts (or requests/demands) of the subscribers/clients may "collide" and all must try again. Unfortunately, reattempts of the subscribers/clients may continue to collide.

For example, a reattempt algorithm may be implemented by a subscriber/client device when a network service provider server fails. Here, the subscriber/client device may reschedule attempts to obtain data from the network service provider server. It should be appreciated that a successful reattempt algorithm may balance several conflicting objectives. For example, the reattempt algorithm may need to obtain data quickly. In addition, the reattempt algorithm may need to avoid overloading the servers when sending reattempts.

To remedy repeat collisions, backoff algorithms may be implemented so that each subscriber/client may reattempt after a random amount of time (or "backoff"). In the event of another collision, backoff algorithms may decide to change/ alter (e.g., double) the "backoff" period and then change/alter (e.g., double) again if there is another collision. Thus, the time of the backoff may grow exponentially in this algorithm depending on the number of consecutive collisions.

It should be appreciated that other backoff variations may also be used. Rather than exponentially growing backoffs, some backoff algorithms may be linear. For example, a linearly growing backoff may start with a base backoff, then a backoff twice that of the base backoff, then a backoff that is tripled, and so forth.

Whether a backoff algorithm is linear, exponential, and/or other similar algorithm, two features may remain in common. First, the backoff may be independent of the server capacity. Second, the backoff may be independent of the duration of the failure period. However, it should be appreciated that conventional backoff algorithms do not know how much spare capacity an Ethernet-based or wireless system/network has available. Moreover, conventional backoff algorithms typically cannot accommodate longer failure periods since many of them were designed/programmed for short congestion periods.

Thus, exemplary embodiments may provide a system and method for providing adaptive backoff. That is, exemplary embodiments may, among other things, provide an adaptive backoff that takes into consideration a duration of failure period and/or recovery period to spread out backoff and/or reattempts. In addition, reattempt/requests for electronic media/data of the exemplary embodiments may be achieved in a manner that is efficient for operation within the framework of existing media access technologies.

FIG. 1 depicts a block diagram of a system architecture for providing adaptive backoff, according to an exemplary embodiment. The system 100 may be referred to as having a vendor side and a subscriber side. The vendor side of the system 100 may include one or more media storage devices 102 communicatively coupled to one or more media modules 104 (e.g., one or more multimedia servers). The vendor side may be communicatively coupled to the subscriber side via network 106. The subscriber side may include, among other things, one or more media boxes 108 and one or more output devices, such as a display device 110 and/or other similar device.

The media storage device 102 may communicate with one or more processors (not shown) of the media module 104 and may be configured to store and/or index data and/or information. It should be appreciated that each media storage device 102 may comprise one or more databases. In this example, the one or more databases may store, among other things, data and/or information such as electronic program guides (EPGs). In addition, the one or more databases may also store other information related to television (TV) programs, movies, advertisements, music videos, music, and/or other media content. In some embodiments, the media content may be available on demand (e.g., video-on-demand). In other embodiments, the media content may be received on a regular basis, e.g., daily, weekly, hourly, or other predetermined intervals. The media box 108 may be in communication with the media module 104, such that in the event a request for media content is requested from the media box 108 and/or the output device 110 over the network 106 and received at the media module 104, the media module 104 may distribute the requested media content to the media box 108 and/or output device 110. Here, the media box 108 may utilize processor logic to identify the desired data and/or information to optimize distribution and efficient delivery of the media content. In addition to providing media content, the media box 108 may also record, store, and/or index media-related data and/or information.

The media module 104 may include one or more processors (not shown) for providing media-related data and/or information, e.g., electronic program guides (EPGs) and/or other electronic data/information. For example, the media module 104 may include a SQL Server, UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other independent server to provide media-related data and/or information. Also, the media module 104 may store and/or run a variety of software, for example, Microsoft/NET framework.

Although the media module 104 is depicted as one module, it should be appreciated that the contents of the media module 104 may be combined into fewer or greater numbers of modules, servers (or server-like devices) and may be connected to one or more data storage systems, in addition to the media storage 102. Furthermore, the media module 104 may be local, remote, or a combination thereof to the media module 104 and/or output device. In some embodiments, the media module 104 may be physical, virtual, or a combination thereof. In other embodiments, the media module 104 may also store additional data and/or information relevant for personalized functionalities. For example, the media module 104 may store data including customer preferences, settings, viewing history, ratings, reviews, rebroadcast rights and information, etc. This data may be used for customizing services provided by or to a network provider (e.g., a service provider) hosting the media box 108. The media module 104 may also customize or personalize subscriber services by recording, storing, indexing and/or using additional data/information related to customer preferences and/or viewing habits. Other various embodiments may also be provided.

The network 106 may include any network (e.g., Internet) for communicatively coupling servers, modules, devices, and/or network systems. The network 106 may provide communication ability between the various servers, modules, devices, and/or network systems via electric, electromagnetic, and/or optical signals that carry digital data streams. For example, the network 106 may be a wireless network, a wired network or any combination of wireless network and wired network. For example, the network 106 may include, without limitation, Internet network, satellite network (e.g., operating in Band C, Band Ku and/or Band Ka), wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other wireless network for transmitting a signal. In addition, the network 106 may include, without limitation, telephone line, fiber optics, IEEE Ethernet 802.3, wide area network (WAN), local area network (LAN), global network such as the Internet. Also, the internal data network 106 may enable, an Internet network, a wireless communication network, a cellular network, an Intranet, or the like, or any combination thereof. The network 106 may further include one, or any number of the exemplary types of networks mentioned above operating as a stand-alone network or in cooperation with each other.

The media box 108 may include one or more receivers, transmitters, and/or transceivers for receiving signals and/or transmitting signals. For example, the media box 108 may be a set top box, a personal video recorder (PVR) (e.g., a digital video recorder (DVR)), and/or other various component and technology for transmitting, receiving, and/or controlling media content. It should also be appreciated that High-Definition (HD) capabilities may also be provided.

The media box 108 may include one or more processors (not shown) for receiving, processing, and/or using media-related data and/or information, e.g., electronic program guides (EPGs) and/or other electronic data/information. Although the media box 108 is depicted as one module, it should be appreciated that the contents of the media box 108 may be combined into fewer or greater numbers of components, modules, servers (or server-like devices) and may be connected to one or more data storage systems (not shown). Furthermore, the media box 108 may be local, remote, or a combination thereof to the media module 104 and/or output device. In some embodiments, the media box 108 may be physical, virtual, or a combination thereof. In other embodiments, the media box 108 may also store additional data and/or information relevant for personalized functionalities. For example, the media box 108 may store data including customer preferences, settings, viewing history, ratings, reviews, rebroadcast rights and information, etc. This data may be used for customizing services provided by or to a network provider (e.g., a service provider) hosting the media box 108. The media box 108 may also customize or personalize subscriber services by recording, storing, and/or indexing additional data/information related to customer preferences and/or viewing habits. Other various embodiments may also be provided.

As discussed above, the media box 108 may include one or more processors (not shown) and one or more data storage systems to provide adaptive backoff. In particular, the media box 108 may be configured to request, receive, and/or process media from the media module 104. It should also be appreciated that media may also be provided to the media box 108 from other media sources (not shown) outside of the media module 104. It should be appreciated that media may include multimedia, such as a television program, a movie, a music video, an advertisement, a music file, an image, an electronic file, an electronic game, a website, and an electronic message. Other various media may also be provided.

The output device 110 may be any device capable of transmitting data, receiving data, and/or presenting data. In one embodiment, the output device may include a display device 110, such as a television, a monitor, an interactive television, a receiver, a tuner, a high definition (HD) television, a HD receiver, a video-on-demand (VOD) system. In another embodiment, the output device may be a communications device, such as a personal digital assistant (PDA), a mobile phone, a smart phone, a network appliance, an Internet browser, a pager, a mobile device, or a handheld device. In yet another embodiment, the output device may be a computer, such as a desktop computer, a laptop/notebook, a workstation, a thin system, a fat system, a remote controller, or other device, such as a multimedia device, an alert device, an audio device (e.g., MP3 player), a video game console, a video game controller, a digital photo frame, a global positioning system (GPS), personal video recorder (PVR) (e.g., a digital video recorder (DVR)), or other device capable of transmitting, receiving, and/or presenting signals.

It should be appreciated that each of the components of the system 100 may be configured to receive, transmit, and/or process signals/data. For example, each component (e.g., servers, server-like systems, and/or modules) of the system 100 may have one or more receivers, one or more transmitters, and/or one or more processors in order to communicate (e.g., receive, process, and/or transmit data/information) with the other components of system 100. Communications may be achieved via transmission of electric, electromagnetic, optical, or wireless signals and/or packets that carry digital data streams using a standard telecommunications protocol and/or a standard networking protocol. These may include, but are not limited to, Session Initiation Protocol (SIP), Voice Over IP (VoIP) protocols, Wireless Application Protocol (WAP), Media Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers (e.g., service providers) and/or subscribers may also use standard wireless protocols including IEEE 802.11a, 802.11b, 802.11g, etc., or via protocols for a wired connection, such as an IEEE Ethernet 802.3

It should be appreciated that one or more data storage systems (e.g., the one or more media storages 102 and/or other databases) may also be communicatively coupled to each of the components (e.g., devices and/or servers) of the system 100. In one embodiment, the one or more data storage systems may store relevant information for each of the servers and system components. Exemplary database information may include information related to electronic program guides (EPGs), order request, order number, order sequence, network provider information, media name/code, media channel numbers, media channel names, media listings/categories, program schedules, media availability, future and past programming information, ratings, viewer preferences, advertisement categories, advertisers, advertised products/services, and/or other information provided by a viewer, network provider, storage source (e.g., pre-recorded TV programs/movies), or other third party source.

It should be appreciated that the contents of any of the data storage systems may be combined into fewer or greater numbers of data storage systems and may be stored on one or more data storage systems and/or servers. Furthermore, the data storage systems may be local, remote, or a combination thereof. In other embodiments, information stored in the databases may be useful in providing additional customizations for enhanced media or TV-viewing experience.

Additionally, one or more processors (not shown) may also be coupled to each of the components (e.g., servers, modules, devices, system components, and/or the one or more data storage systems) of the system 100. It should be appreciated that the one or more processors may be used for at least processing, calculating, organizing, multiplexing, demultiplexing, remultiplexing, compressing, decompressing, formatting, and reformatting data and/or information. In another embodiment, for example, the one or more processors may be used for logic processing, as described above, for efficient product delivery, network resource management, etc.

Referring back to FIG. 1, exemplary embodiments may use information about failure periods and/or spare server capacity to schedule reattempts to match the reattempt rate to what the servers may be able handle. For example, in one embodiment, the media box 108 may run schedule update requests after a failure period in a distributed fashion, e.g., without knowledge of any other actions by other media boxes 108. Each media box 108 may use only knowledge about capacity of system device (e.g., media module 104 or other similar system component), which may be a known value based on system engineering, and knowledge that may be inferred about the failure period. In other words, adaptive backoff may coordinate reattempt behavior (e.g., of multiple media boxes 108) to keep the aggregate load of reattempts at or below the system capacity.

As described above, conventional reattempt algorithms may not be able provide an effective solution because they search for the "right" reattempt rate, starting from an initial rate chosen arbitrarily without any knowledge of system load, system capacity, and/or history of failed attempts. As a result, after a failure period, a subscriber/client device may reattempt too quickly and overload the servers or may reattempt too slowly and make the updating process take much longer than it needs to be.

In accordance with exemplary embodiments, a backoff or reattempt algorithm may be provided (e.g., at the media box 108) to optimize system recovery after failure periods. This backoff or reattempt algorithm may be adaptive and may enable subscriber side components (e.g., media module 104) to run at or near 100% utilization during recovery, thereby working off the backlogged client requests rapidly and efficiently.

Figure 2A:
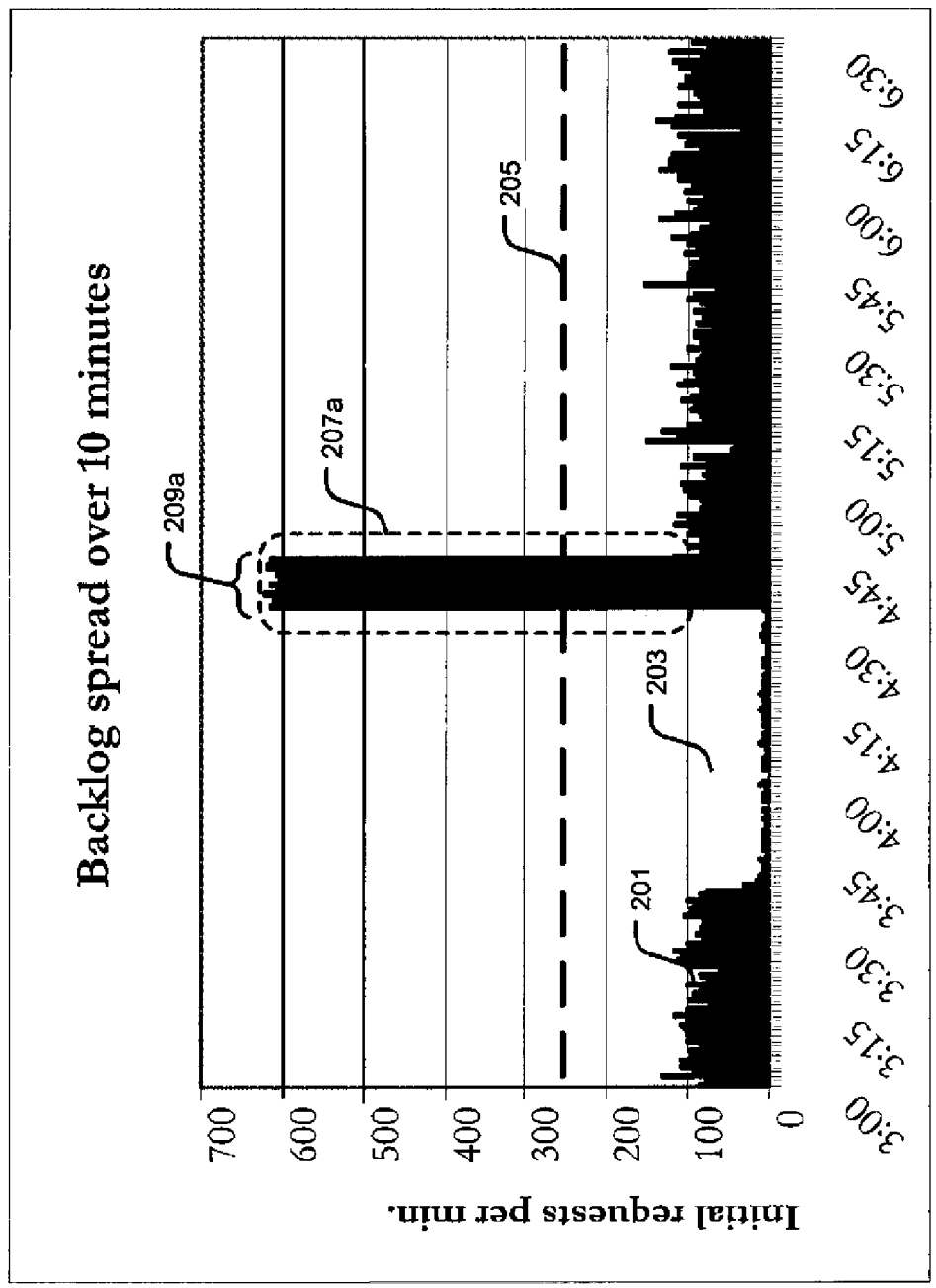
FIGS. 2A-2C depict illustrative graphs for spreading backlog over a predetermined time period, according to an exemplary embodiment.
Figure 2B:
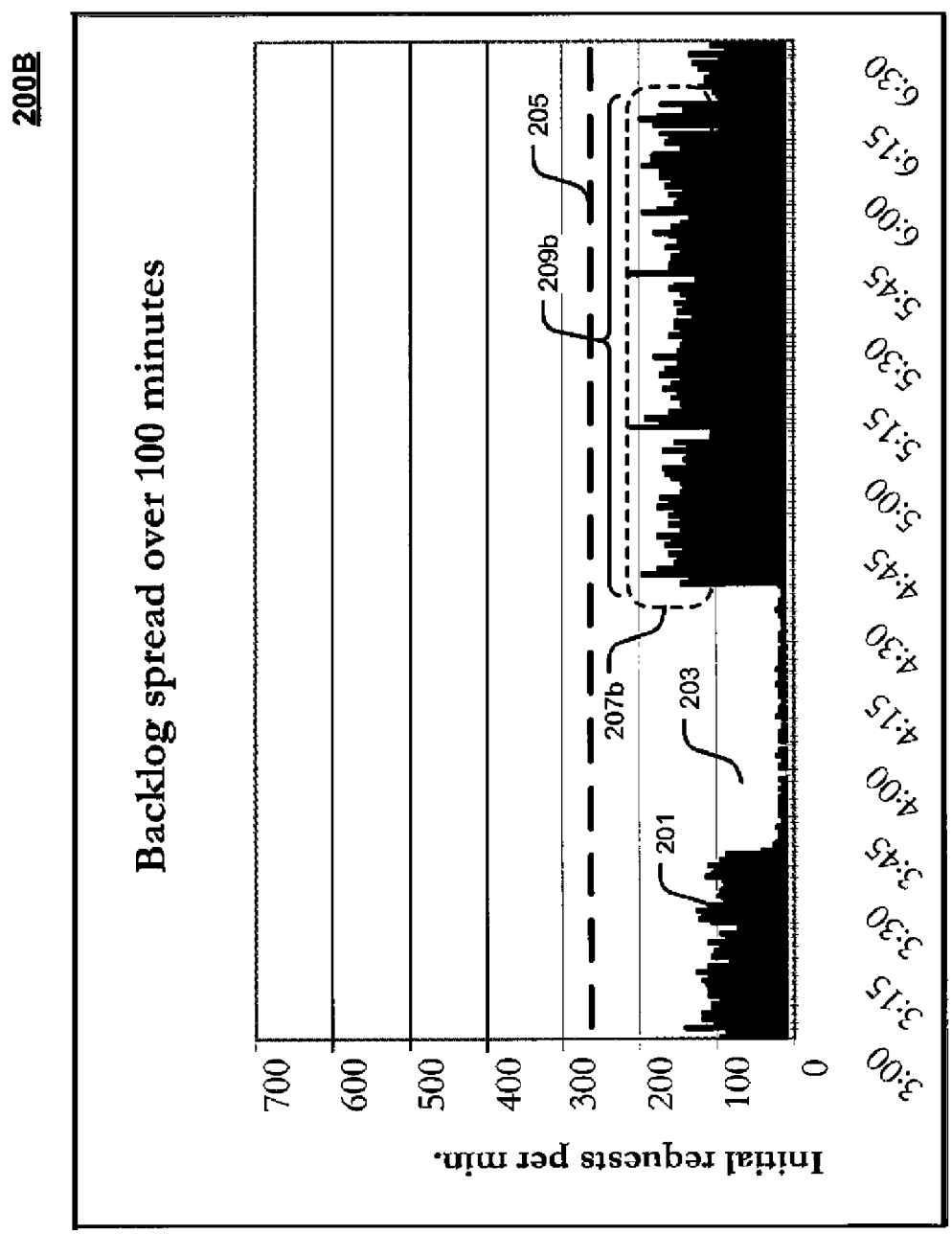
Figure 2C:
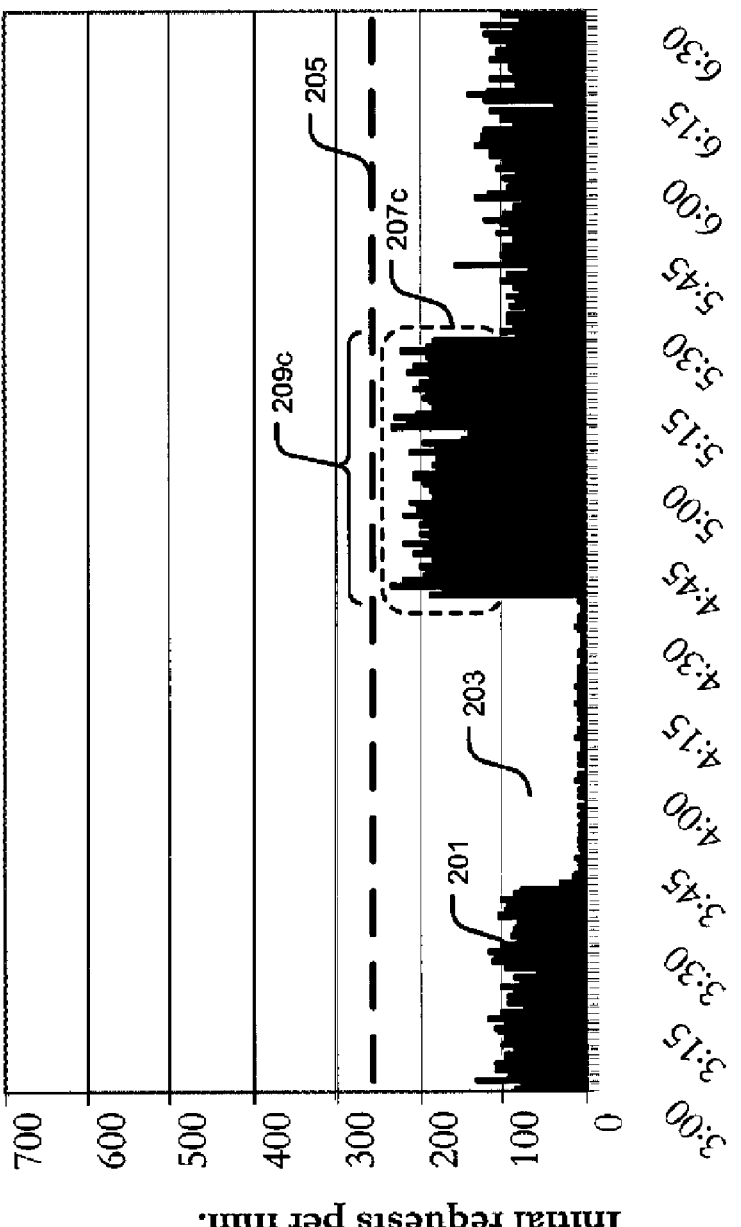

For example, FIGS. 2A-2C depict illustrative graphs for spreading backlog over a predetermined time period, according to an exemplary embodiment. In FIG. 2A, an illustrative graph 200A for depicting adaptive backoff for spreading backlog over a predetermined time period (e.g., 3:00 AM to 6:30 AM) may be shown. In this example, initially scheduled data requests 201 may be made by the client (e.g., via media box 108). These requests may be successfully communicated and each media box 108 may receive the requested data. However, at approximately 3:45 AM, the vendor side components may experience a failure period 203 (e.g., one or more servers of the media module 104 may fail). Accordingly, data requests by the media box 108 to the media module 104 scheduled during this failure period 203 may not be successfully communicated and the requested data (e.g., electronic program guide (EPS)) may not be received as scheduled. Although vendor side components may generally schedule a certain number of data requests per minute (e.g., 100 data requests per minute), system capacity 205 may handle approximately 250 data requests per minute without limiting and/or slowing down processing. In FIG. 2A, the illustrative graph 200A may show that the failure period 203 ends after approximately 50 minutes (e.g., at 4:35 AM). As a result, there may be a 50 minutes worth of backlogged data request which need to be rescheduled. In one embodiment, the media boxes 108 may provide adaptive backoff to handle backlog of data requests 207a by spreading them over a period of time 209a (e.g., 10 minutes). However, as depicted in FIG. 2A, handling a 50-minute backlog in a 10 minute time frame may still surpass system capacity 205 and overload it.

In FIG. 2B, the illustrative graph 200B may show that a failure period 203 that ends after approximately 50 minutes (e.g., at 4:35 AM). However, in this example, the media boxes 108 may provide adaptive backoff to handle backlog of data requests 207b by spreading them over a period of time 209b (e.g., 100 minutes). Although handling a 50-minute backlog in a 100 minute time frame may not surpass system capacity 205 and therefore not overload it, as depicted, it should be appreciated that such handling of the backlog may remain inefficient since full system capacity is not fully utilized and the backlog spread covers too long of a time period.

In FIG. 2C, the illustrative graph 200C may show that a failure period 203 that ends after approximately 50 minutes (e.g., at 4:35 AM) as well. However, in this example, the media boxes 108 may provide adaptive backoff to handle backlog of data requests 207c by spreading them over a period of time 209c (e.g., 50 minutes). In this example, handling a 50-minute backlog in a 50 minute time frame may utilize full or near-full system capacity 205 and therefore not overload it and provide an efficient way to provide requested data to clients who did not initially receive the scheduled requested data during the failure period 203.

It should be appreciated that each of the backlog spreads 207a, 207b, and 207c may contain the same amount of data requests (e.g., 50-minutes worth) which were initially scheduled during the 50-minute failure period 203. Accordingly, the backlog may be expressed as:

Backlog=First-Offered Load*Failure Period (FP)

Because adaptive backoff, as described above, may ideally provide reattempts that maximize spare capacity of vendor system/components, backlog may also be expressed as:

Backlog=Spare Capacity*Recovery Period (RP)

Accordingly, in order to provide adaptive backoff, exemplary embodiments may need to: (1) determine how long recovery period in order to maximize and/or keep capacity at near-full utilization, and (2) spread backlogged requests uniformly over the determined recovery period. However, duration of failure period and duration of recovery period may not generally be known values. Thus, exemplary embodiments may provide adaptive backoff using values that are known, such as those shown in Table 1 below:

TABLE 1

KNOWN VALUES FOR PROVIDING ADAPTIVE BACKOFF

System Capacity
First-Offered Load (e.g., client population/update period)
Spare Capacity = System Capacity – First-Offered Load Based on these values, backlog may be expressed as:

Backlog=Spare Capacity*Recovery Period (RP)
=First-Offered Load*Failure Period (FP)

Therefore, even though Failure Period (FP) and Recovery Period (RP) may not be known, what may be determined is that the relationship between Recovery Period (RP) and Failure Period (FP) may be expressed as:

(RP)/(FP)=(First-Offered Load)/(Spare Capacity)

When a client polls vendor side systems/components (e.g., media module 104), conventional client systems may request a server of the vendor side if it has new data (e.g., electronic program guide (EPG)). If the answer is "yes," the client may immediately launch a request for the new data. In the event many clients poll the servers in a short time period (as they might after a lengthy failure period), requests for data may overload the servers. Exemplary embodiments may resolve this problem by scheduling the request for data independently and separately from query/poll asking whether the servers have new data.

It should also be appreciated that adaptive backoff may use obtainable information about the system load and capacity and any failure period to spread out backlogged data requests so as not to overload the servers. Client population and polling period determine the demand on the servers during normal downloads, whereas a number of servers/modules and/or data links determine vendor capacity. Thus, a failure period duration may not be known ahead of time (e.g., by each media box 108 of the client), but the algorithm enables clients to infer failure period duration from their own query reattempts.

Figure 3:
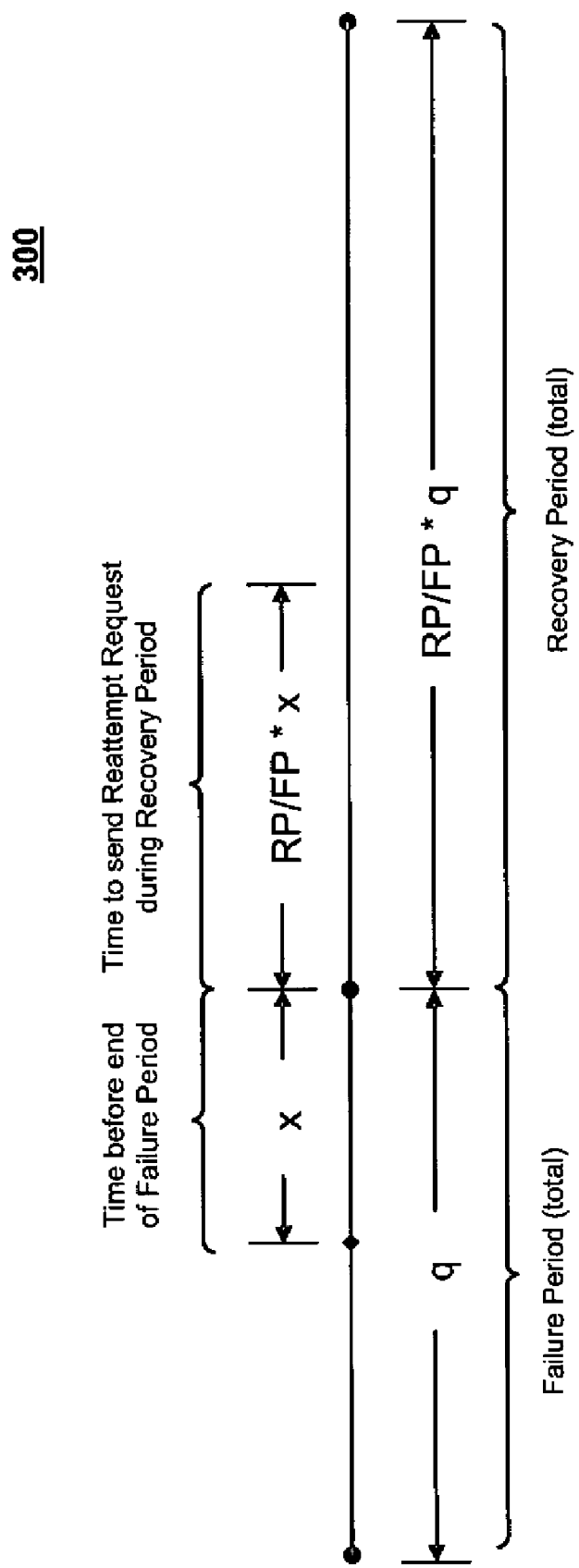
FIG. 3 depicts a schematic timeline for providing adaptive backoff without knowing failure period length, according to an exemplary embodiment.
Figure 4:
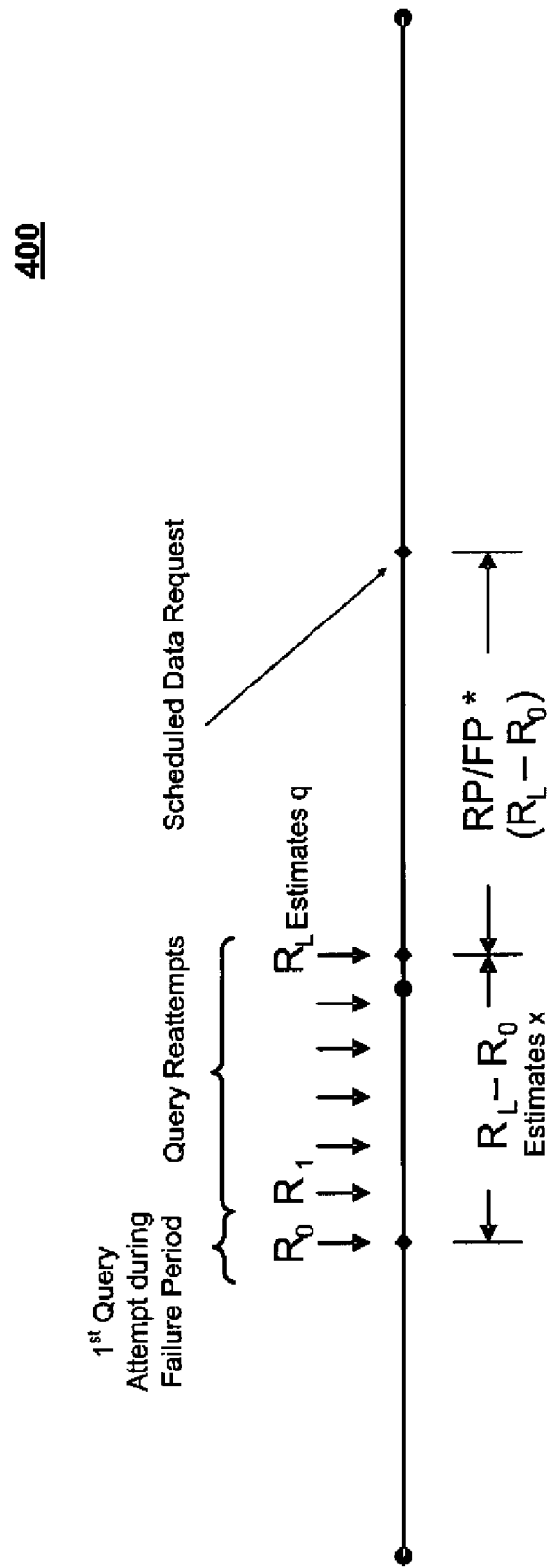
FIG. 4 depicts a schematic timeline for providing an adaptive backoff schedule, according to an exemplary embodiment.

It should be appreciated that FIG. 3 and FIG. 4 will be discussed together. FIG. 3 depicts a schematic timeline 300 for providing adaptive backoff without knowing failure period length or recovery period duration, according to an exemplary embodiment. FIG. 4 depicts a schematic timeline 400 for providing an adaptive backoff schedule, according to an exemplary embodiment.

In FIG. 3 and FIG. 4, it should be appreciated that there may be a large population of clients, where these clients may need data updates fairly regularly. It should also be appreciated that in the event that a single server complex (e.g., media module 104) becomes unreachable, server/module overload may be possible because each client generally receives one or more data updates individually. It should also be appreciated that there may be a need to spread requests uniformly.

In order to fully appreciate the schematic timeline 300 of FIG. 3 and the schematic timeline 400 of FIG. 4, the following notations may be used:

N=the number of clients (e.g., hundreds of thousands)

p=polling period duration (e.g., 3 to 6 hours). Every client schedules a data update request daily during the polling period.

$\lambda$=N/p=the mean client update request rate (per second) under normal operating conditions (no failures)

q=failure period duration (seconds)

$\mu$=maximum clients per second that the system can update $\rho=\lambda/\mu$=system utilization during normal IPG conditions. We assume that we size the system to keep the utilization less than 100% (for example, 75%).

$\tau$=the length (to be determined) of an interval over which backlogged client requests are spread uniformly after a failure period In some embodiments, a recovery period (RP) may be determined based on several mathematical calculations set forth below. For example, assuming that a failure period (FP) overlaps a polling period, when the failure period (FP) ends, a backlog of $\lambda q$ clients may be built up. In addition, in the event the failure period (FP) ends while some clients are still polling at rate $\lambda$, a total mean client request rate may be expressed as $\lambda+\lambda q/\tau$. Here, $\tau$ may be used to represent keeping request arrival rate at less than system capacity, which may be rearranged and expressed as:

$$\lambda + \lambda q/\tau < \mu \quad (1)$$

$$\tau > \frac{q}{\rho^{-1}-1} = \frac{\lambda q}{\mu - \lambda} \quad (2)$$

For brevity, it should be appreciated that $\sigma=1/(\rho^{-1}-1)$. Thus, according to (2), the length $\tau$ of the interval over which reattempts may be spread is the failure period "dilated" by the factor $\sigma$. For example, in some embodiments, if the utilization $\rho=75\%$, then $\sigma=3$, which may justify the term, "dilation." However, it should be appreciated that if $\rho<50\%$, then $\sigma<1$, in which case the reattempt interval may be shorter than the failure period.

It should be appreciated that $\sigma$ may be a known quantity because $\sigma$ may depend only on the target normal operating utilization $\rho$. Moreover, because adaptive backoff may depend on $\sigma$, scaling may be automatic with changes in the client population.

In some embodiments, query and data request scheduling may be provided based on several mathematical calculations as well. Initially, it should be appreciated that the beginning of the failure period may be denoted by time 0 so that the failure period may be [0, q]. Accordingly, the corresponding recovery period may be [q, q+σq].

Therefore, in some embodiments, the function and features of adaptive backoff may be provided as described below. For example, as depicted in FIG. 4, a client (e.g., media box 108) may make its initial data request (e.g., for an electronic program guide (EPG)) within the failure period (FP), at time x seconds before the failure period's end. This request may fail due unresponsiveness of the vendor side system (e.g., media module 104). The client may then reschedule its first request at time q+σx. Geometrically, adaptive back off may do two things. First, adaptive backoff may reflect the initial request time through the point q. In one embodiment, if adaptive backoff performed only this feature, a request may be rescheduled from x seconds before q until x seconds after q. As a result, all initial requests originally in the interval [0, q] may be rescheduled to the interval [q, 2q] and their temporal order would be reversed.

However, adaptive backoff may also change/alter (e.g., by dilating or shrinking) the reattempt interval by the factor σ in order to keep system/server utilization at or near 100%. Accordingly, another factor may be provided to make the utilization any number less than 100%.

As discussed above, implementation of adaptive backoff may require clients, each of whom may act independently, to distribute their requests uniformly over the recovery period. To schedule requests in the manner described above, the clients may first need to discover when the failure period ends. To do this, adaptive backoff may separate the task of querying the servers whether new data is available from the task of requesting that data. Until the client receives a response from the vender side components (e.g., media module 104 and/or servers) to indicate that the failure period has ended, only then does the client (e.g., media box 108) send queries to the servers for requesting data.

Referring to the schematic timeline 400 of FIG. 4, $R_0$ may represent the time of a client's first (originally scheduled) poll in the interval [0, q], $R_k$ may represent be the times of successive queries where k=1, 2, 3, ..., L, and L denotes the first poll after time q. It should be appreciated that at each of the times $R_k$, the client may query for the presence of new data. In the event that the client does not receive any response, the client may reschedule a query at time $R_{k+1}$, according to some predetermined query reattempt algorithm (e.g., once every 10 seconds, etc.).

At time $R_L$, for example, the client may finally receive a response from the server, indicating that it is back up and running again. Assuming that the response says that new data is available, the client may estimate quantities q and x by the following:

$q \approx R_L$ and $x \approx R_L - R_0$.

Here, the client may then schedule its request for the guide data at time $$T = R_L + \sigma(R_L - R_0) \quad (3)$$

It should be appreciated that the client may determine $R_0$ exactly, but may only estimate the value of q. However, the smaller the time between queries, the closer $R_L$ may become to q. Therefore, the only limit to how small the time between query reattempts becomes may be the resulting system utilization from the requests at time $R_L$. As a result, workload from queries may be much smaller than that from data requests, as the servers may need only respond to a query with a short reply instead of a much larger file for all data requests.

Adaptive backoff may provide system overload under the assumption that the original poll requests scheduled during and after the failure period were uniformly distributed. The transformation (3) may preserve uniform distribution, possibly adding it to uniformly distributed new requests after the failure period. As a result, if the mean request rates satisfy (1), the instantaneous rates may as well.

In the even that request (3) fail adaptive backoff may restart, setting $R_0 = T$. If failure was merely random error, meaning that the query at the new $R_1$ succeeds, adaptive backoff may schedule a new data request at time $R_1 + \sigma(R_1 - R_0)$. It may then be faster to schedule the new data request at time $R_1$.

It should be appreciated that behavior of adaptive backoff during normal polling operation may be noted. If the failure period is of length zero, then $R_0 = R_L$ and $T = R_0$ may be provided, meaning that the client may schedule its data request as soon as it gets a response that new data is available.

The scheduling timeline in (3) may be conservative in the sense that it may assume new requests are to continue to arrive at rate $\lambda$ the entire time the servers work off the backlog. Thus, in the event new requests finish during the recovery period, server utilization may fall by $\rho$.

By performing the various features and functions as discussed above, adaptive backoff may be provided. Not only does this provide an effective and improved technique for providing media, it may also enhance the overall media experience (e.g., TV-watching, music-listening, etc.). Accordingly, exemplary embodiments may expand the limited number of techniques for providing media in the event there are prolonged vendor side component failure.

Providing adaptive backoff may have several advantages. For example, as discussed above, adaptive backoff may use polling to determine whether vendor side systems/components are accessible for requesting new data in a way that does not overload the system, and if the vendor side systems/components are accessible, to then schedule a data request that optimizes server/system capacity without overloading it as well. This may be particularly helpful in longer failure periods, for which the duration may remain unknown and considerable backlog for data may be generated. Thus, exemplary embodiments provide a way to reflect, stretch, and/or preserve uniform distribution of reattempts so as to achieved optimum system utilization during recovery.

Figure 5:
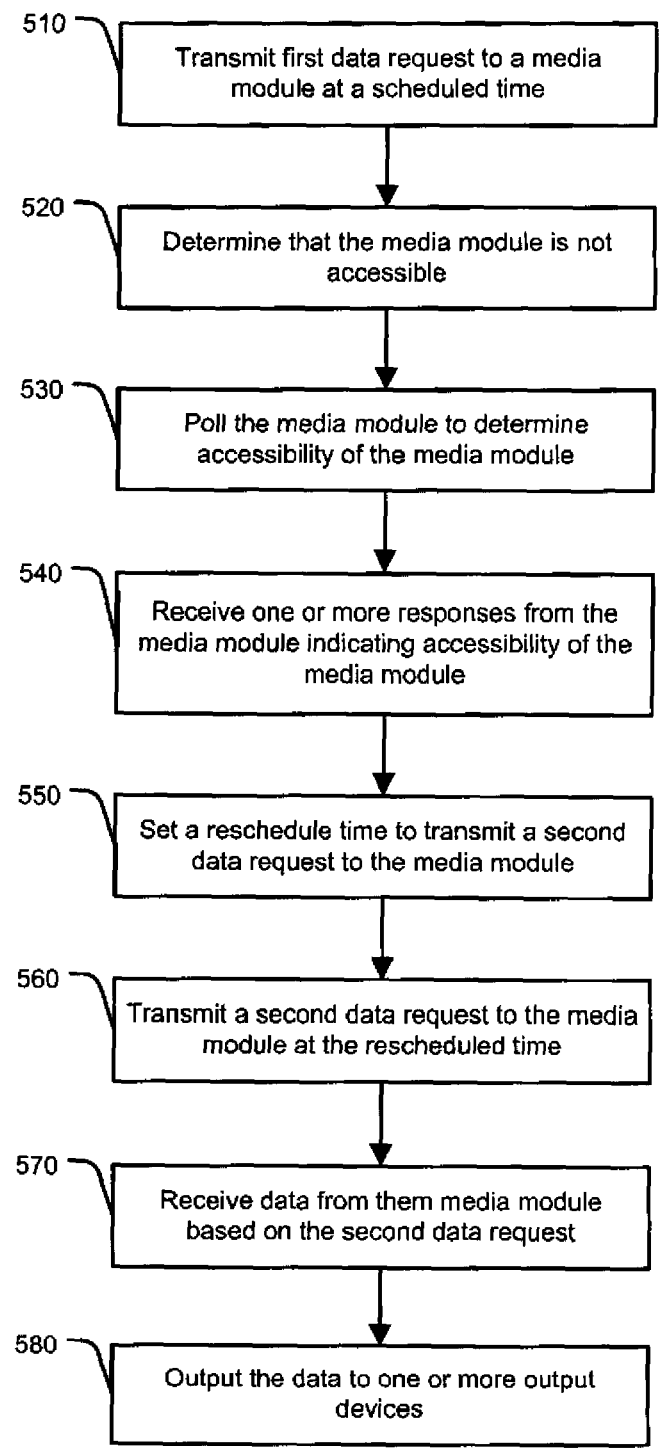
FIG. 5 depicts a flowchart of a method for providing adaptive backoff at a media box, according to an exemplary embodiment.

FIG. 5 depicts a flowchart of a method for providing adaptive backoff 500 at a media box 108, according to an exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. A computer readable media comprising code to perform the acts of the method 500 may also be provided. Referring to FIG. 5, the exemplary method 500 may begin at block 510.

At block 510, a first data request may be transmitted. For example, one or more transmitters at the media box 108 may transmit a first data request to a media module 104 at a scheduled time. In some embodiments, data requested by the first data request may be an electronic program guide (EPG). In other embodiments, data requested by the first data request may be at least one of a television program, a movie, a music video, an advertisement, a music file, an image, an electronic file, an electronic game, a website, and an electronic message.

At block 520, inaccessibility of the media module may be determined. For example, one or more processors at the media box 108 may determine that the media module 108 is inaccessible. In some embodiments, determining that the media module is inaccessible may include identifying, at the media box 108, that the media module is unresponsive to at least the first data request. In other embodiments, determining that the media module is inaccessible may include receiving, at the media box 108, one or more messages of inaccessibility from the media module 104.

At block 530, the media module 108 may be polled. For example, the one or more transmitters of the media box 108 may poll the media module 108 to determine accessibility of the media module. In some embodiments, polling the media module 104 may include transmitting, from the media box 108, one or more queries to the media module 104. It should be appreciated that polling may be achieved via any predetermined time interval, e.g., seconds, minutes, etc.

At block 540, one or more responses may be received from the media module 108. For example, one or more receivers at the media box 108 may receive one or more responses to the polling of the media module 104. The one or more responses may indicate accessibility of the media module 104. It should be appreciated that in the event the media module 104 is not accessible (e.g., failure, etc.), one or more responses may not be received and the media module 104 may continue to be polled, as described above in block 530.

At block 550, a rescheduled time for transmitting a second data request may be set. For example, the one or more processors of the media box 108 may set a rescheduled time for the media box 108 to transmit a second data request to the media module 104. The rescheduled time may be based at least in part on optimizing system capacity of the media module. In some embodiments, setting the rescheduled time may include determining a recovery period duration and setting a time during the recovery period when the media module has capacity to handle the second data request.

It should be appreciated that the rescheduled time may be based at least in part on one of system capacity of the media module, spare capacity of the media module, a first-offered load at the media module, a period of inaccessibility of the media module, a recovery period duration for the media module to handle one or more second data update requests from one or more media boxes, and a duration of polling by the media box at the media module.

For example, the rescheduled time may be based on the following expression:

$$T = R_L + \sigma(R_L - R_0),$$

where T may represent the rescheduled time, $R_0$ may represent time of a first (originally scheduled) poll, $R_k$ may represent the times of successive polls where k=1, 2, 3, ..., L, and L may represent the first poll after time q, q may represent the inaccessible period in seconds, σ may represent a proportional factor. In this example, the proportional factor σ may be based on the following expression:

$$\sigma = 1/(\rho^{-1} - 1),$$

where $$\tau > \frac{q}{\rho^{-1} - 1} = \frac{\lambda q}{\mu - \lambda} \text{ and } \lambda + \lambda q/\tau < \mu,$$

such that ρ may represent polling period duration, $\lambda = N/p$ may represent mean client update request rate per second under accessible operating conditions, N may represent a number of clients, q may represent inaccessible period duration per second, μ may represent a maximum data requests per second that the media module can handle, $\rho = \lambda/\mu$ may represent system utilization during normal accessible operating conditions, and τ may represent length of an interval over which data requests are spread uniformly after the inaccessible period duration.

At block 560, the second data request may be transmitted. For example, the one or more transmitters at the media box 108 may transmit the second data request to the media module at the rescheduled time.

At block 570, data may be received from the media module 108. For example, the one or more receivers at the media box 108 may receive the request data from the media module 104 based on the second data request.

At block 580, the requested data may be output. For example, an output at the media box 108 may output the data to one or more output devices 110. As discussed above, in some embodiments, the data may be an electronic program guide (EPG). In other embodiments, the data may be at least one of a television program, a movie, a music video, an advertisement, a music file, an image, an electronic file, an electronic game, a website, and an electronic message.

Figure 6:
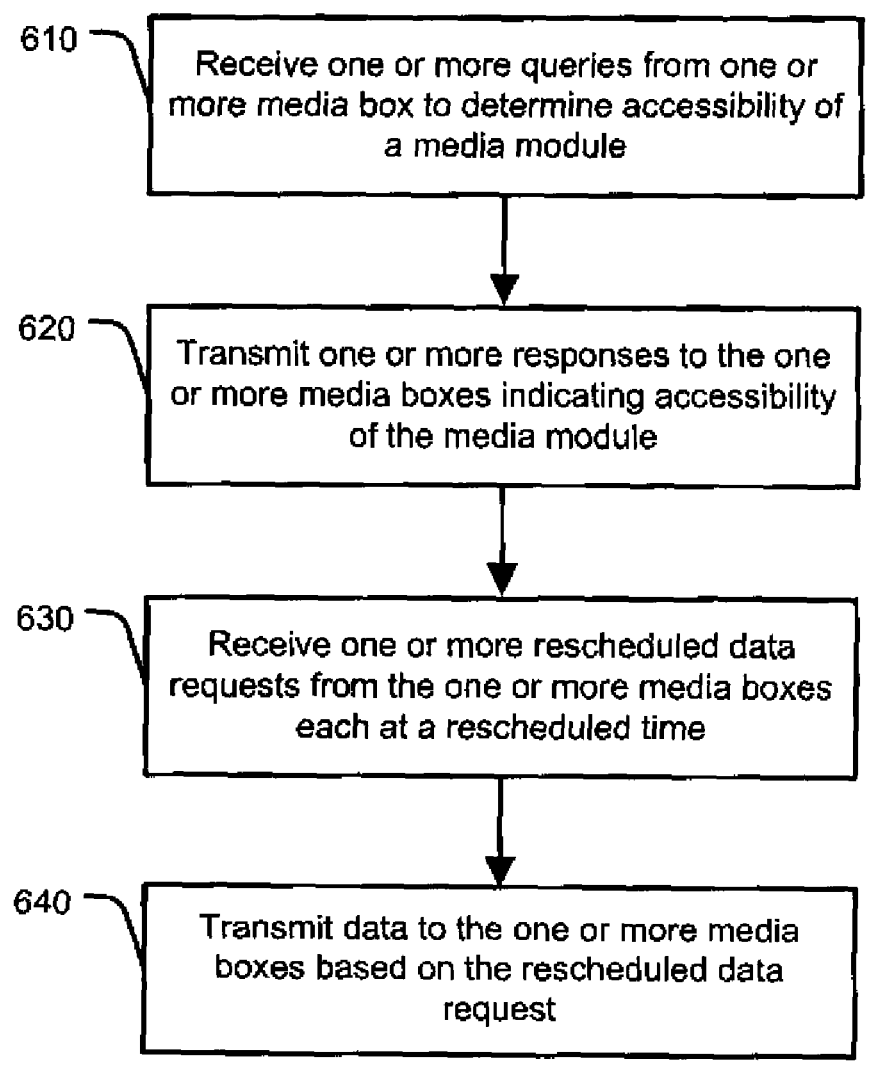
FIG. 6 depicts a flowchart of a method for providing adaptive backoff at a server, according to an exemplary embodiment.

FIG. 6 depicts a flowchart of a method for providing adaptive backoff 600 at a media module 104, according to an exemplary embodiment. The exemplary method 600 is provided by way of example, as there are a variety of ways to carry out methods disclosed herein. The method 600 shown in FIG. 6 may be executed or otherwise performed by one or a combination of various systems. The method 600 is described below as carried out by the system 100 shown in FIG. 1 by way of example, and various elements of the system 100 are referenced in explaining the example method of FIG. 6. Each block shown in FIG. 6 represents one or more processes, methods, or subroutines carried in the exemplary method 600. A computer readable media comprising code to perform the acts of the method 600 may also be provided. Referring to FIG. 6, the exemplary method 600 may begin at block 610.

At block 610, one or more queries from one or more media boxes 108 may be received. For example, one or more receivers at the media module 104 may receive one or more queries from one or more media boxes 108 to determine accessibility of the media module 104. In some embodiments, the one or more queries from the one or more media boxes may be received in uniform time intervals from each of the one or more media boxes.

At block 620, one or more responses may be transmitted. For example, one or more transmitters at the media module 104 may transmit one or more responses to the one or more media boxes 108 indicating accessibility of the media module 104 based on the received one or more queries.

At block 630, one or more rescheduled data requests may be received. For example, the one or more receivers at the media module 104 may receive one or more rescheduled data requests from the one or more media boxes 108 each at a rescheduled time. The rescheduled time may be based at least in part on optimizing system capacity of the media module. In some embodiments, the rescheduled time may be set within a recovery period duration and during the recovery period when the media module has capacity to handle the second data request. It should be appreciated that the rescheduled time for each of the one or more media boxes may be uniformly spread across the recovery period.

It should be also appreciated that the rescheduled time may be based at least in part on one of system capacity of the media module, spare capacity of the media module, a first-offered load at the media module, a period of inaccessibility of the media module, a recovery period duration for the media module to handle one or more second data update requests from one or more media boxes, and a duration of polling by the media box at the media module.

For example, the rescheduled time may be based on the following expression:

$$T = R_L + \sigma(R_L - R_0),$$

where T may represent the rescheduled time, $R_0$ may represent time of a first (originally scheduled) poll, $R_k$ may represent the times of successive polls where $k=1, 2, 3, \ldots, L$, and L may represent the first poll after time q, q may represent the inaccessible period in seconds, σ may represent a proportional factor. In this example, the proportional factor σ may be based on the following expression:

$$\sigma = 1/(\rho^{-1} - 1),$$

where $$\tau > \frac{q}{\rho^{-1} - 1} = \frac{\lambda q}{\mu - \lambda} \text{ and } \lambda + \lambda q/\tau < \mu,$$

such p may represent polling period duration, λ=N/p may represent mean client update request rate per second under accessible operating conditions, N may represent a number of clients, q may represent inaccessible period duration per second, μ may represent a maximum data requests per second that the media module can handle, ρ=λ/μ may represent system utilization during normal accessible operating conditions, and τ may represent length of an interval over which data requests are spread uniformly after the inaccessible period duration.

At block 640, data may be transmitted. For example, the one or more transmitters at the media module 104 may transmit data based on the one or more rescheduled data requests to the one or more media boxes 108. In some embodiments, the data may be an electronic program guide (EPG). In other embodiments, the data may be at least one of a television program, a movie, a music video, an advertisement, a music file, an image, an electronic file, an electronic game, a website, and an electronic message.

Embodiments of providing adaptive backoff may expand the limited number of techniques for ensuring a efficient and comprehensive distribution of media/electronic content. By providing for adaptive backoff during period of vendor side inaccessibility (e.g., extended failure period), a technique for rescheduling a second data request may be provided that is efficient, optimizes system utilization, and uses existing hardware components. As a result, the overall multimedia experience may be further enhanced because viewers/customers may receive updated media/data more readily and at their convenience.

In addition to the benefits described above, embodiments of the system and method for providing adaptive backoff may allow network providers (e.g., TV service providers) the ability to service a larger subscriber pool since existing protocols may remain intact. Moreover, advantages in business and marketing may also be apparent. When customers/subscribers become increasingly satisfied with a network provider, for example, customer loyalty and customer referrals may expand clientele. Additionally, providing such a technique for providing adaptive backoff may maximize advertisement and marketing opportunities with third party vendors, etc., which may not otherwise be provided.

While the features and functionalities for providing adaptive backoff are primarily discussed with respect to the embodiments above, it should be appreciated that the features and functionalities of one embodiment may be similarly applied to other embodiments. Furthermore, while the media content is described primarily in reference to optimizing backlogged data requests for electronic program guides (EPGs), it should be appreciated that the functions and features of the embodiments of the system and method may apply similarly to a host of other media and non-media content as well, where applicable.

While the embodiments described above may be directed to the media module 104 and the media box 108 to provide adaptive backoff as discussed above, it should be appreciated that other components, such as an output display device, a recording system, other vendor-side/subscriber-side components, etc., may include processing capabilities to perform the features described above as well. Additionally, it should be appreciated that one or more of these devices and/or components may be combined (e.g., a TV and a network card) to provide adaptive backoff as described above.

Furthermore, although the embodiments described above are directed toward television media content (e.g., electronic program guides (EPGs)), it may be readily appreciated that the features and may apply to any video, audio, and/or web-based component, such as computers, communications devices, PVRs or DVRs, media websites/servers, DVDs players, VCRs, CD players, MP3s players, etc.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   transmitting, from a media box, a first data request to a media module at a scheduled time;
   determining, at the media box, that the media module is inaccessible;
   polling, from the media box, the media module to determine accessibility of the media module;

receiving, at the media box, one or more responses to the polling of the media module, wherein the one or more responses indicate accessibility of the media module;

setting, at the media box, a rescheduled time for the media box to transmit a second data request to the media module, wherein setting the rescheduled time comprises:

determining a ratio between recovery period and failure period based on first-offered load and spare capacity of the media module; and setting the rescheduled time during the recovery period when the media module has capacity to handle the second data request; and transmitting, from the media box, a second data request to the media module at the rescheduled time;

wherein the rescheduled time is based on:

$$T = R_L + \sigma(R_L - R_0),$$

where T represents the rescheduled time, $R_0$ represents time of a first (originally scheduled) poll, $R_k$ represents the times of successive polls where k=1,2,3, . . . L, and L denotes the first poll after time q, q represents the inaccessible period in seconds, σ represents a proportional factor.

2. The method of claim 1, the method further comprising:
receiving, at the media box, data from the media module based on the second data request; and
outputting, from the media box, the data to one or more output devices.

3. The method of claim 1, wherein determining that the media module is inaccessible comprises identifying, at the media box, that the media module is unresponsive to at least the first data request.

4. The method of claim 1, wherein determining that the media module is inaccessible comprises receiving, at the media box, one or more messages of inaccessibility from the media module.

5. The method of claim 1, wherein polling the media module comprises transmitting, from the media box, one or more queries to the media module.

6. The method of claim 1, wherein the rescheduled time is based at least in part on one of system capacity of the media module, spare capacity of the media module, a first-offered load at the media module, a period of inaccessibility of the media module, a recovery period for the media module to handle one or more second data update requests from one or more media boxes, and a duration of polling by the media box at the media module.

7. A method, comprising:
transmitting, from a media box, a first data request to a media module at a scheduled time;
determining, at the media box, that the media module is inaccessible;
polling, from the media box, the media module to determine accessibility of the media module;
receiving, at the media box, one or more responses to the polling of the media module, wherein the one or more responses indicate accessibility of the media module;
setting, at the media box, a rescheduled time for the media box to transmit a second data request to the media module, wherein the rescheduled time is based at least in part on optimizing system capacity of the media module; and
transmitting, from the media box, a second data request to the media module at the rescheduled time;
wherein the rescheduled time is based on:

$$T = R_L + \sigma(R_L - R_0),$$

where T represents the rescheduled time, $R_0$ represents time of a first (originally scheduled) poll, $R_k$ represents the times of successive polls where k=1,2,3, . . . ,L, and L denotes the first poll after time q, q represents the inaccessible period in seconds, σ represents a proportional factor.

8. The method of claim 7, wherein the proportional factor σ is based on the following:

$$\sigma = 1/(\rho^{-1} - 1),$$

where $$\tau > \frac{q}{\rho^{-1} - 1} = \frac{\lambda q}{\mu - \lambda} \text{ and } \lambda + \lambda q/\tau < \mu,$$

such p represents polling period duration, λ=N/p represents mean client update request rate per second under accessible operating conditions, N represents a number of clients, q represents inaccessible period duration per second, μ represents a maximum data requests per second that the media module can handle, ρ=λ/μ represents system utilization during normal accessible operating conditions, and τ represents length of an interval over which data requests are spread uniformly after the inaccessible period duration.

9. The method of claim 1, wherein the data is at least one of a television program, a movie, a music video, an advertisement, a music file, an image, an electronic file, an electronic game, a website, an electronic message, and an electronic program guide.

10. A non-transitory computer readable media comprising code to perform the acts of the method of claim 1.

11. A system, comprising:
one or more transmitters configured to transmit a first data request to a media module at a scheduled time, poll the media module to determine accessibility of the media module, and transmit a second data request to the media module at a rescheduled time determined by the one or more processors;
one or more processors configured to determine that the media module is inaccessible and set the rescheduled time for the media box to transmit a second data request to the media module in the event the media module is accessible, wherein setting the rescheduled time comprises:
determining a ratio between recovery period and failure period based on first-offered load and spare capacity of the media module; and
setting the rescheduled time during the recovery period when the media module has capacity to handle the second data request; and
one or more receivers configured to receive one or more responses to the polling of the media module, wherein the one or more responses indicate accessibility of the media module, to receive data from the media module based on the second data request; and
an output configured to output the data to one or more output devices;
wherein the rescheduled time is based on:

$$T = R_L + \sigma(R_L - R_0),$$

where T represents the rescheduled time, $R_0$ represents time of a first (originally scheduled) poll, $R_k$ represents the times of successive polls where k=1,2,3, . . . L, and L denotes the first poll after time q, q represents the inaccessible period in seconds, σ represents a proportional factor.

12. A method, comprising:
receiving, at a media module, one or more queries from a plurality of media boxes to determine accessibility of the media module;
transmitting, from the media module, one or more responses to the plurality of media boxes indicating accessibility of the media module;
receiving, at the media module, one or more rescheduled data requests from the plurality of media boxes each at a rescheduled time, wherein the rescheduled time for each of the media boxes is uniformly spread across the recovery period;
transmitting, from the media module, data based on the rescheduled data request to the plurality of media boxes;
wherein the rescheduled time is based on:

$$T = R_L + \sigma(R_L - R_0),$$

where T represents the rescheduled time, $R_0$ represents time of a first (originally scheduled) poll, $R_k$ represents the times of successive polls where k=1,2,3, ... L, and L denotes the first poll after time q, q represents the inaccessible period in seconds, σ represents a proportional factor.

13. The method of claim 12, wherein the one or more queries from the plurality of media boxes are received in uniform time intervals from each of the one or more media boxes.

14. The method of claim 12, wherein the rescheduled time is set within a recovery period duration and during the recovery period when the media module has capacity to handle the second data request.

15. The method of claim 12, wherein the rescheduled time is based at least in part on one of system capacity of the media module, spare capacity of the media module, a first-offered load at the media module, a period of inaccessibility of the media module, a recovery period duration for the media module to handle one or more second data update requests from one or more media boxes, and a duration of polling by the media box at the media module.

16. A method, comprising:
receiving, at a media module, one or more queries from one or more media boxes to determine accessibility of the media module;
transmitting, from the media module, one or more responses to the one or more media boxes indicating accessibility of the media module;
receiving, at the media module, one or more rescheduled data requests from the one or more media boxes each at a rescheduled time, wherein the rescheduled time is based at least in part on optimizing system capacity of the media module; and
transmitting, from the media module, data based on the rescheduled data request to the one or more media boxes;
wherein the rescheduled time is based on:

$$T = R_L + \sigma(R_L - R_0),$$

where T represents the rescheduled time, $R_0$ represents time of a first (originally scheduled) poll, $R_k$ represents the times of successive polls where k=1,2,3, ... L, and L denotes the first poll after time q, q represents the inaccessible period in seconds, σ represents a proportional factor.

17. The method of claim 16, wherein the proportional factor σ is based on the following:

$$\sigma = 1/(\rho^{-1} - 1),$$

where $$\tau > \frac{q}{\rho^{-1} - 1} = \frac{\lambda q}{\mu - \lambda} \text{ and } \lambda + \lambda q/\tau < \mu,$$

such p represents polling period duration, λ=N/p represents mean client update request rate per second under accessible operating conditions, N represents a number of clients, q represents inaccessible period duration per second, μ represents a maximum data requests per second that the media module can handle, ρ=λ/μ represents system utilization during normal accessible operating conditions, and τ represents length of an interval over which data requests are spread uniformly after the inaccessible period duration.

18. The method of claim 12, wherein the data is at least one of a television program, a movie, a music video, an advertisement, a music file, an image, an electronic file, an electronic game, a website, an electronic message, and an electronic program guide.

19. A non-transitory computer readable media comprising code to perform the acts of the method of claim 12.

20. A system, comprising:
one or more receivers configured to receive one or more attempts from a plurality of media boxes to determine accessibility of the media module and receive one or more second data requests from the plurality of media boxes each at a rescheduled time, wherein the rescheduled time for each of the one or more media boxes is uniformly spread across the recovery period;
one or more processors configured to process the one or more attempts from the plurality of media boxes and to determine accessibility of the media module; and
one or more transmitters configured to transmit one or more responses to the plurality of media boxes indicating accessibility of the media module and transmit data based on the second data request to the plurality of media boxes;
wherein the rescheduled time is based on:

$$T = R_L + \sigma(R_L - R_0),$$

where T represents the rescheduled time, $R_0$ represents time of a first (originally scheduled) poll, $R_k$ represents the times of successive polls where k=1,2,3, ... L, and L denotes the first poll after time q, q represents the inaccessible period in seconds, σ represents a proportional factor.

* * * * *